US007142617B2

(12) United States Patent
Mohan

(10) Patent No.: US 7,142,617 B2
(45) Date of Patent: *Nov. 28, 2006

(54) NARROW BAND CHAOTIC FREQUENCY SHIFT KEYING

(75) Inventor: Chandra Mohan, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/478,950

(22) PCT Filed: May 17, 2003

(86) PCT No.: PCT/US02/15584

§ 371 (c)(1),
(2), (4) Date: Nov. 24, 2003

(87) PCT Pub. No.: WO02/096053

PCT Pub. Date: Nov. 28, 2003

(65) Prior Publication Data

US 2004/0165681 A1 Aug. 26, 2004

Related U.S. Application Data

(60) Provisional application No. 60/293,308, filed on May 24, 2001.

(51) Int. Cl.
*H03D 3/00* (2006.01)
*H04L 27/00* (2006.01)
*G05B 13/02* (2006.01)
(52) U.S. Cl. .................... 375/323; 370/342; 700/38
(58) Field of Classification Search ............. 375/130, 375/133, 234, 285, 295–296, 346, 366; 380/263, 380/274, 28, 34, 44, 46; 706/17; 708/250; 331/78

See application file for complete search history.

(56) References Cited

U.S. PATENT DOCUMENTS 4,550,292 A  10/1985  Smith ....................... 331/2

(Continued)

FOREIGN PATENT DOCUMENTS

WO    WO 02/096052    11/2002

OTHER PUBLICATIONS

Carroll, T.L., Using the Cyclostationary Properties of Chaotic Signals for Communication, Mar. 2002, IEEE Transctions on Circuits and Systems I: Fundamental Theory and Applications, vol. 49, Issue 3, pp. 357-362.*

(Continued)

*Primary Examiner*—Emmanuel Bayard
*Assistant Examiner*—Lawrence B. Williams
(74) *Attorney, Agent, or Firm*—Joseph J. Laks; Robert B. Levy; Joseph J. Kolodka

(57) ABSTRACT

A system and method for signal transmission and reception by narrow band chaotic frequency shift keying includes a forward error correction encoder for receiving input data, a data packetizer in signal communication with the forward error correction encoder, a compression encoder in signal communication with the data packetizer, a radio frequency link in signal communication with the compression encoder, a compression decoder in signal communication with the radio frequency link, a data depacketizer in signal communication with the compression decoder, and a forward error correction decoder in signal communication with the data depacketizer for recovering the input data by controlling the orbits of chaos; where the method includes the steps of transmitting a signal indicative of chaotic frequency shift keyed data, propagating the transmitted signal within a narrow frequency band, and receiving the propagated signal substantially without degradation of the indicated data by controlling the orbits of chaos.

11 Claims, 9 Drawing Sheets

U.S. PATENT DOCUMENTS

| | | | |
|---|---|---|---|
| 5,168,356 A | 12/1992 | Acampora et al. | 358/133 |
| 5,432,697 A * | 7/1995 | Hayes | 700/38 |
| 5,510,976 A * | 4/1996 | Tanaka et al. | 700/54 |
| 5,680,462 A * | 10/1997 | Miller et al. | 380/263 |
| 5,751,899 A * | 5/1998 | Large et al. | 704/207 |
| 5,818,712 A * | 10/1998 | Glenn et al. | 700/54 |
| 5,923,760 A | 7/1999 | Abarbanel et al. | 380/34 |
| 5,926,385 A * | 7/1999 | Lee | 700/38 |
| 6,014,445 A | 1/2000 | Kohda et al. | 380/28 |
| 6,178,217 B1 * | 1/2001 | Defries et al. | 380/263 |
| 6,212,239 B1 * | 4/2001 | Hayes | 375/259 |
| 6,216,093 B1 * | 4/2001 | Corron et al. | 702/57 |
| 6,363,153 B1 * | 3/2002 | Parker et al. | 380/263 |
| 6,370,248 B1 * | 4/2002 | Carroll et al. | 380/263 |
| 6,631,166 B1 * | 10/2003 | Carroll | 375/259 |
| 6,744,893 B1 * | 6/2004 | Fleming-Dahl | 380/263 |
| 6,792,111 B1 * | 9/2004 | Italia et al. | 380/263 |
| 6,854,058 B1 * | 2/2005 | Carroll | 713/168 |
| 6,999,445 B1 * | 2/2006 | Dmitriev et al. | 370/342 |
| 2002/0172291 A1 * | 11/2002 | Maggio et al. | 375/259 |
| 2002/0176455 A1 * | 11/2002 | Triandaf et al. | 372/21 |
| 2004/0192234 A1 * | 9/2004 | Glenn et al. | 455/127.1 |
| 2004/0223616 A1 * | 11/2004 | Kocarev et al. | 380/263 |
| 2005/0021308 A1 * | 1/2005 | Tse et al. | 702/188 |

OTHER PUBLICATIONS

Heil et al., ON/OFF Phase Shift Keying for Chaos-Encryted Communication Using External-Cavity Semiconductor Lasers, Sep. 2002, IEEE Journal of Quantum Electronics, vol. 38, Issue 9, pp. 1162-1170.*

Dedieu, et al., Chaos Shift Keying: Modulation and Demodulation of a Chaotic Carrier Using Self-Synchronizing Chua's Circuit's, Oct. 1993, IEEE Transctions on Circuits and Systems II, vol. 40, Issue 10, pp. 634-342.*

Galias et al., Quadrature Chaos Shift Keying, May 6-9, 2001, 2001 IEEE International Symposium Circuits and Systems, vol. 3, pp. 313-316.*

Baziliauskas et al., "*Synchronization of Chaotic Colpitts Oscillators*", 42nd Riga Technical University Conference, Rtucet '01, Oct. 12, 2001, pp. 55-58, Riga, Latvia.

Chaun Lian Koh et al., "*Digital Communication Method Based on M-Synchronized Chaotic Systems*", IEEE Transactions on Circuits and Systems—1: Fundamental Theory and Applications, vol. 44, No. 5, May 1997, pp. 383-390.

Geza Kolumban et al., "*The Role of Synchronization in Digital Communications Using Chaos—Part I: Fundamentals of Digital Communications*", IEEE Transactions on Circuits and Systems—1: Fundamental Theory and Applications, vol. 44, No. 10, Oct. 1997, pp. 927-936.

Martin Hasler et al., "*An Introduction to the Synchronization of Chaotic Systems: Coupled Skew Tent Maps*", IEEE Transactions on Circuits and Systems—1: Fundamental Theory and Applications, vol. 44, No. 10, Oct. 1997, pp. 856-866.

Paul A. Bernhardt, "*Communications Using Chaotic Frequency Modulation*", International Journal of Bifurcation and Chaos, vol. 4, No. 2, 1994, pp. 427-440.

Martin Hasler, "*Current problems for the transmission or information using a chaotic signal*", IEEE (0-7803-4247-X/97), 1997, COC'97, St. Petersburg, Russia, pp. 195-200.

G, Kolumban, et al., entitled "FM-DCSK: A Novel Method for Chaotic Communications", 1998, pp. IV-477-IV-480, IEEE.

* cited by examiner $$f(x) = \begin{cases} \dfrac{x}{a} & \text{if } x \le a \\ \dfrac{1-x}{1-a} & \text{if } a < x \end{cases}$$

$$f(x) = \begin{cases} b\dfrac{x}{a} & \text{for } x \le a \\ b\dfrac{1-x}{1-a} & \text{for } x > a \end{cases}$$

NARROW BAND CHAOTIC FREQUENCY SHIFT KEYING

This application claims the benefit under 35 U.S.C. § 365 of International Application PCT/US02/15584 filed May 17, 2002, which claims the benefit of the U.S. Provisional Application No. 60/293,308 filed May 24, 2001.

BACKGROUND

The present disclosure relates to signal transmission and reception. There have been a number of approaches to the design of communication systems based on chaos, such as those suggested by Kocarev (1992), Belsky and Dmitriev (1993), Cuomo (1993), Pecora and Carrol (1993), and Dmitriev and Starkov (1997). These prior approaches have been focused on analog spread-spectrum types of systems and, hence, were inherently broadband. Moreover, there has been no attempt to restrict the state-space orbits of chaotic systems through symbolic constraints. Performance assessments have been done on these prior and other similar systems, but such systems have lacked symbolic dynamic controls or channel bandwidth controls.

The following are some definitions provided to enhance understanding of the descriptions that follow:

In geometry, linearity refers to Euclidean objects such as lines, planes, (flat) three-dimensional space, and the like. These objects appear the same no matter how they are examined. A nonlinear object, such as a sphere, for example, looks different for different scales. When viewed closely, it looks like a plane; and from afar, it looks like a point. In algebra, linearity is defined in terms of functions that have the properties $f(x+y)=f(x)+f(y)$ and $f(ax)=a\,f(x)$. Nonlinearity is defined as the negation of linearity. This means that the result $f(x+y)$ may be out of proportion to the inputs x and/or y. Thus, nonlinear systems do not follow superposition themes.

A dynamical system has an associated abstract phase space or state space with coordinates that describe the dynamical state at any instant; and a. dynamical rule that specifies the immediate future trend of all state variables, given the present values of those state variables. Dynamical systems are "deterministic" if there is a unique consequent to every state; and "stochastic" or "random" if there is more than one consequent, typically chosen from some probability distribution. A dynamical system can be defined with respect to discrete or continuous time. The discrete case is defined by a map, $z_1=f(z_0)$, which gives the state $z_1$ resulting from the initial state $z_0$ at the next discrete time value. The continuous case is defined by a "flow", $z(t)=\phi(t)(z_0)k$, which gives the state at time t given that the state was $z_0$ at time 0. A smooth flow can be differentiated with respect to ("w.r.t.") time to give a differential equation, $dz/dt=F(z)$. In this case, $F(z)$ is called a vector field, which gives a vector pointing in the direction of the velocity at every point in a phase space.

A phase space or state space is the collection of possible states of a dynamical system. A state space can be finite (e.g., for the ideal coin toss, there are two states, heads and tails), countably infinite (e.g., where the state variables are integers), or uncountably infinite (e.g., where the state variables are real numbers). Implicit in the notion of state or phase space is that a particular state in phase space specifies the system completely. It is all one needs to know about the system to have complete knowledge of the immediate future.

Thus, the phase space of the planar pendulum is two-dimensional, consisting of the position or angle and velocity. Note that in a non-autonomous system where the map of the vector field depends explicitly on time (e.g., a model for plant growth that depends on solar flux), then, according to the definition of phase space, time must be included as a phase space coordinate since one must specify a specific time (e.g., 3 pm on Tuesday) to know the subsequent motion. Thus $dz/dt=F(z,t)$ is a dynamical system on the phase space consisting of (z,t), with the addition of the new dynamic $dt/dt=1$. The path in phase space traced out by a solution of an initial value problem is called an orbit or trajectory of the dynamical system. If the state variables take real values in a continuum, the orbit of a continuous-time system is a curve; while the orbit of a discrete-time system is a sequence of points.

The notion of degrees of freedom as is used for Hamiltonian systems means one canonical conjugate pair: a configuration, q, and its conjugate momentum, p. Hamiltonian systems always have such pairs of variables and so the phase space is even-dimensional. In dissipative systems, the term phase space is often used differently to designate a single coordinate dimension of phase space.

A map is a function f on the phase space that gives the next state $f(z)$ (i.e., the "image") of the system given its current state z. A function must have a single value for each state, but there may be several attempt states that give rise to the same image. Maps that allow every state of the phase space to be accessed onto and which have precisely one pre-image for each state (i.e., a one-to-one correspondence) are invertible. If, in addition, the map and its inverse are continuous with respect to the phase space coordinate z, then it is called a homeomorphism. Iteration of a map means repeatedly applying the consequents of the previous application. Thus producing the sequence:

$$Z_n = f(z_{n-1}) = f(f(Z_{n-2}) \ldots ) = f(z_0)$$

where this sequence is the orbit or trajectory of the dynamical system with initial condition $z_0$.

Every differential equation gives rise to a map. The time1 map advances the flow one unit of time. If the differential equation contains a term or terms periodic with time T, then the time T map in a system represents a Poincare section. This map is also called a stroboscopic map as it is effectively looking at the location in phase space with a stroboscope tuned to the period T. This is useful as it permits one to dispense with time as a phase space coordinate.

In autonomous systems (i.e., no time dependent terms in the equations), it may also be possible to define a Poincare section to reduce the phase space coordinates by one. Here, the Poincare section is defined not by a fixed time interval, but by successive times when an orbit crosses a fixed surface in the phase space. Maps arising out of stroboscopic sampling or Poincare sections of a flow are necessarily invertible because the flow has a unique solution through any point in phase space. Thus, the solution is unique both forward and backward in time.

An attractor is simply a state into which a system settles, which implies that dissipation is needed. Thus, in the long term, a dissipative dynamical system may settle into an attractor. An attractor can also be defined as the phase space that has a neighborhood in which every point stays nearby and approaches the attractor as time goes to infinity. The neighborhood of points that eventually approach the attractor is the "basin of attraction".

Chaos is defined as the effective unpredictable long term behavior arising in a deterministic dynamic system due to its sensitivity to initial conditions. It must be emphasized that a deterministic dynamical system is perfectly predictable given knowledge of its initial conditions, and is in practice always predictable in the short term. The key to long-term unpredictability is a property known as sensitivity to initial conditions. For a dynamical system to be chaotic, it must have a large set of initial conditions that are highly unstable. No matter how precisely one measures the initial conditions, a prediction of its subsequent motion eventually goes radically wrong.

Lyapunov exponents measure the rate at which nearby orbits converge or diverge. There are as many Lyapunov exponents as there are dimensions in the state space of the system, but the largest is usually the most important. Roughly speaking, the maximal Lyapunov exponent is the time constant λ in the expression for the distance between two nearby orbits. If λ is negative, the orbits converge in time and the dynamical system is insensitive to initial conditions. If λ is positive, then the distance between nearby orbits grows exponentially in time and the system becomes sensitive to initial conditions.

Lyapunov exponents can be computed in two ways. In one method, one chooses two nearby points and evolves them in time measuring growth rates of the distance between them. This method has the disadvantage that growth rate is not really a local effect as points separate. A better way to measure growth is to measure the growth rate of the tangent vectors to a given orbit. One defines $$\lambda = \frac{1}{k}\sum \ln|f'(x(j))|$$

for j=0 to k-1. If λ is >0, it gives the average rate of divergence, or, if λ<0, it shows convergence.

The Minimum Phase Space dimension for Chaos is a slightly confusing topic, since the answer depends on the type of system considered. A flow or a system of differential equations is considered first. In this case, the Poincare-Bendixson theorem indicates that there is no chaos in one or two-dimensional phase space. Chaos is possible only in three-dimensional flows. If the flow is non-autonomous (i.e., dependent on time), then time becomes a phase space co-ordinate. Therefore, a system with two physical variables plus a time variable becomes three-dimensional and chaos is possible.

For maps, it is possible to have chaos in one dimension only if the map is not invertible. A prominent example would be a logistic map:

$$x'=f(x)=rx(1-x)$$

This equation is provably chaotic for r=4 and many other values. Note that for every point f(x)<½, the function has two pre-images and hence is not invertible. This concept is important as this method will be used to characterize various topologies of circuits used in realizing a system.

Higher order modulation systems such as M-ary phase shift keying ("PSK") and M-ary quadrature amplitude modulation ("QAM") require high levels of channel linearity in order to be successfully deployed. M-ary PSK and QAM systems are expensive to deploy due to the complexity of the system needed to make the architecture compliant with Federal Communications Commission ("FCC") spectral templates. Systems with M-ary QAM or PSK architectures have a "set-top" box to decode the high-speed subcarrier signals because normal receivers use FM demodulators for recovering the baseband information. In addition, M-ary systems suffer from power loss associated with higher levels of bandwidth compression brought about by the modulation scheme that employ multiple bits per symbol. The M-ary systems become too lossy for practical implementation beyond an upper limit.

SUMMARY

These and other drawbacks and disadvantages of the prior art are addressed by a system and method for signal transmission and reception by narrow band chaotic frequency shift keying.

A method for signal transmission and reception comprises transmitting a signal indicative of at least one of chaotic frequency shift keyed data and chaotic phase shift keyed data; propagating the transmitted signal with a narrow frequency band; and receiving the propagated signal substantially without degradation of the indicated data by controlling the orbits of chaos.

The system includes a forward error correction encoder for receiving input data, a data packetizer in signal communication with the forward error correction encoder, a compression encoder in signal communication with the data packetizer, a radio frequency link in signal communication with the compression encoder, a compression decoder in signal communication with the radio frequency link, a data de-packetizer in signal communication with the compression decoder, and a forward error correction decoder in signal communication with the data de-packetizer for recovering the input data by controlling the orbits of chaos.

The associated method includes the steps of transmitting a signal indicative of chaotic frequency shift keyed data, propagating the transmitted signal within a narrow frequency band, and receiving the propagated signal substantially without degradation of the indicated data by controlling the orbits of chaos.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches Narrow Band Chaotic Frequency Shift Keying in accordance with the following exemplary figures, in which.

DETAILED DESCRIPTION OF PREFERRED EMBODIMENTS

Figure 1:
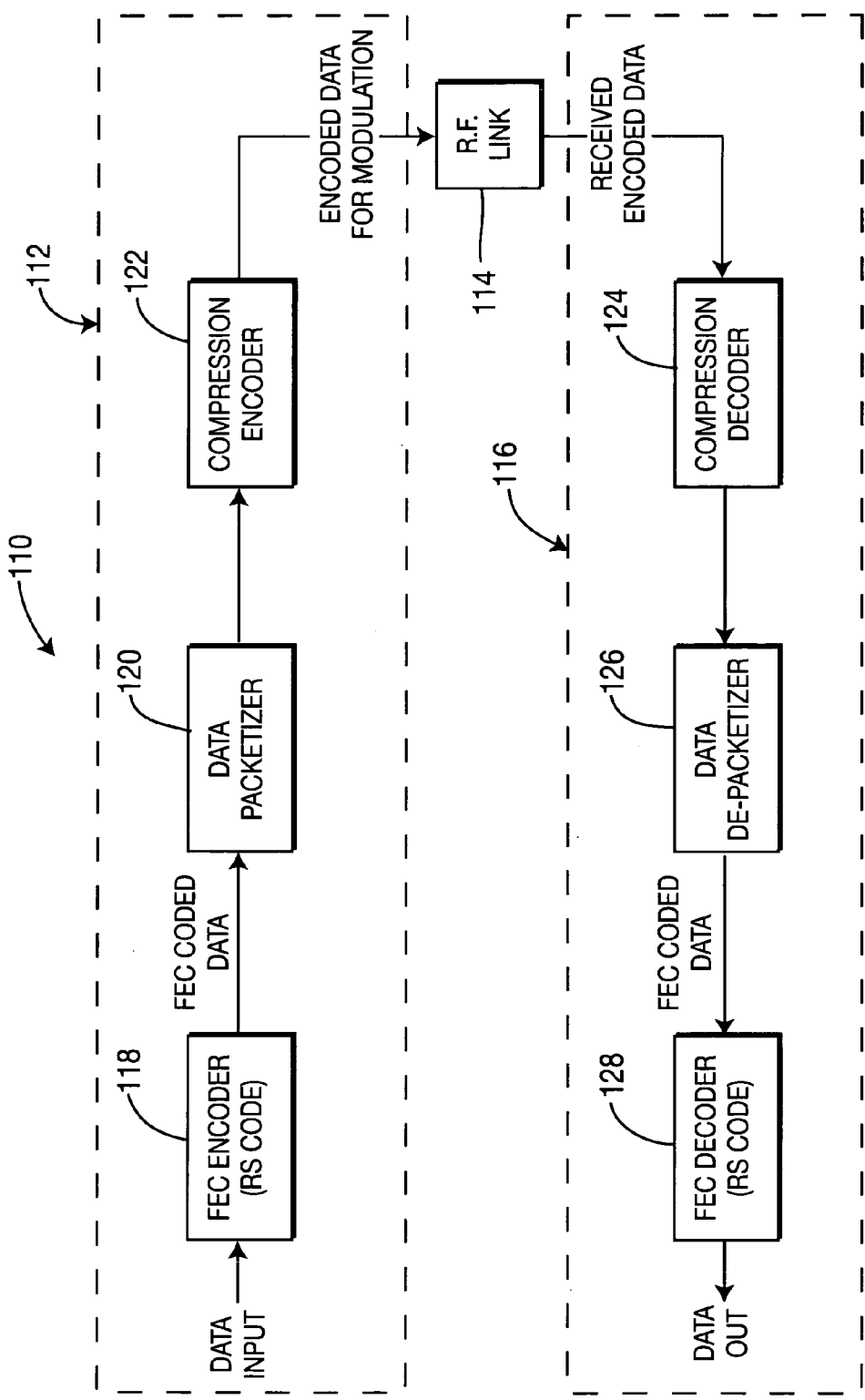
FIG. 1 shows a block diagram of a system for Narrow Band Chaotic Frequency Shift Keying.

The present disclosure relates to signal transmission and reception using a composite information and chaos signal that is modulated onto a carrier signal by frequency shift keying. The disclosure addresses chaos generation using the exemplary non-linear operation of a Colpitts oscillator driven by a tent map to aid synchronization between a transmitter and a receiver. In an exemplary embodiment, the modulator is a wideband voltage-controlled crystal oscillator ("VCXO") that enables a wide pulling range without sacrificing too much of the high tank circuit quality "Q". This results in a clean modulation process with sidebands well below 50 dBc with respect to the carrier. FIG. 1 shows a block diagram of a system 110 for Narrow Band Chaotic Frequency Shift Keying in an illustrative embodiment of the present disclosure. The system 110 includes a transmitter portion 112, a radio frequency ("RF") link 114 in signal communication with the transmitter 112, and a receiver portion 116 in signal communication with the RF link 114. The transmitter portion 112 includes a forward error correction ("FEC") encoder 118 that uses Reed-Solomon ("RS") error correction code for receiving input data, a data packetizer 120 in signal communication with the FEC encoder 118 for receiving FEC coded data, and a compression encoder 122 in signal communication with the data packetizer 120 for providing encoded data for modulation to the RF link 114. The receiver portion 116 includes a compression decoder 124 for receiving encoded data from the RF link, a data de-packetizer 126 in signal communication with the compression decoder 124, and an FEC decoder 128 that uses RS error correction code in signal communication with the data de-packetizer 126 for receiving FEC coded data and providing output data.

Figure 2:
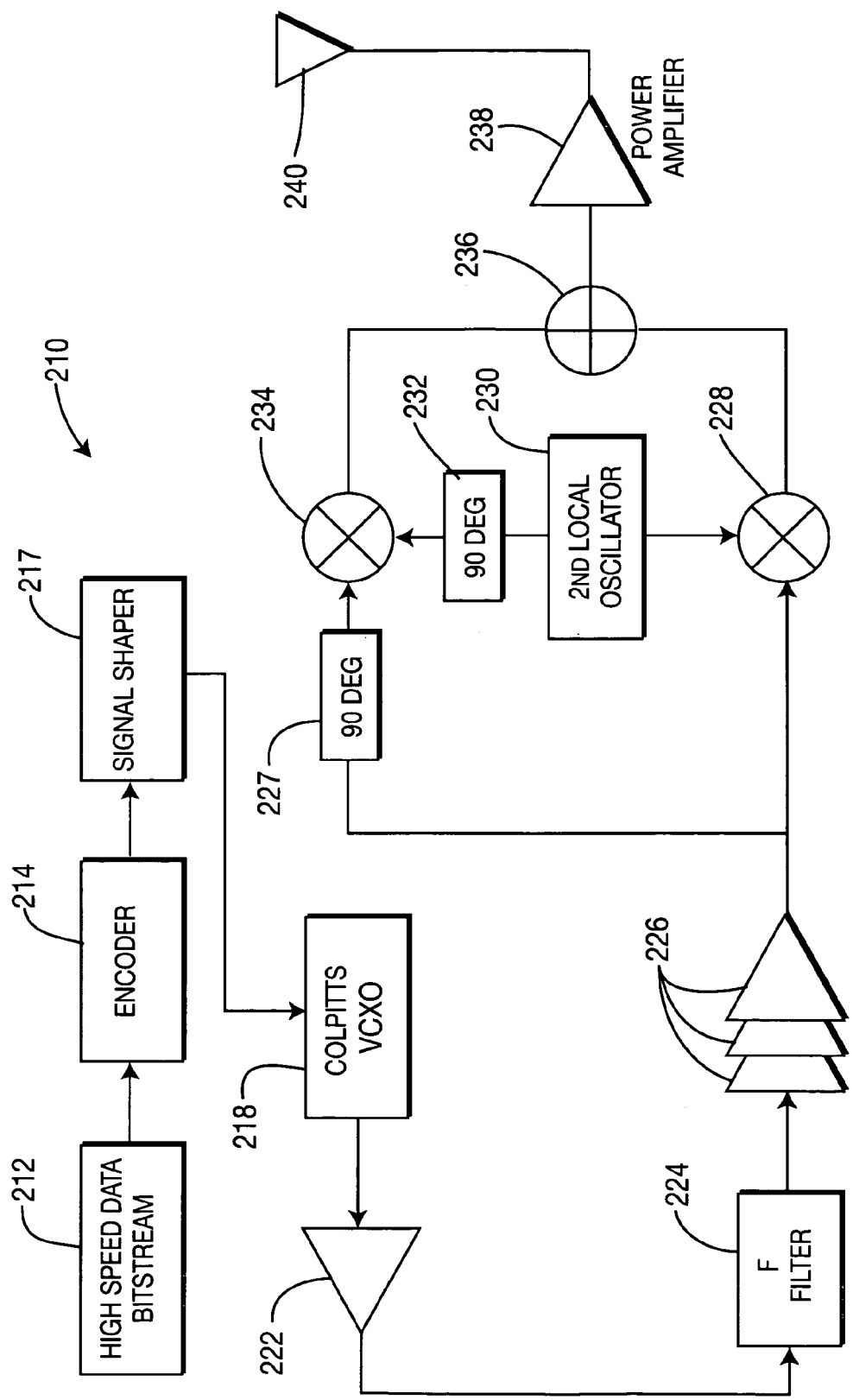
FIG. 2 shows a block diagram for a narrow band chaotic modulation transmitter in accordance with the system of FIG. 1.

Turning to FIG. 2, a narrow band chaotic modulation transmitter 210 represents an exemplary embodiment of the transmitter 112 of FIG. 1. The transmitter 210 receives a high-speed data bit stream 212 at an encoder 214. A signal shaper 217 is in signal communication with the encoder 214, and feeds a first local oscillator 218 comprising a wideband Colpitts VCXO. The first local oscillator 218 feeds an amplifier 222. An intermediate frequency ("IF") filter 224 is in signal communication with the amplifier 222, and feeds an amplifier section 226. The amplifier section 226 feeds a first 90-degree phase delay unit 227 and a multiplier 228. A second local oscillator 230 also feeds the multiplier 228 and feeds a second 90-degree phase delay unit 232. The first and second 90-degree phase delay units 227 and 232 are each received as inputs at a multiplier 234. The multiplier 234 is connected, in turn, to a first positive input of a summer 236. The summer 226 receives a second positive input from the multiplier 228 and feeds a power amplifier 238. The power amplifier 238, in turn, feeds an outgoing communications buffer 240.

Figure 13:
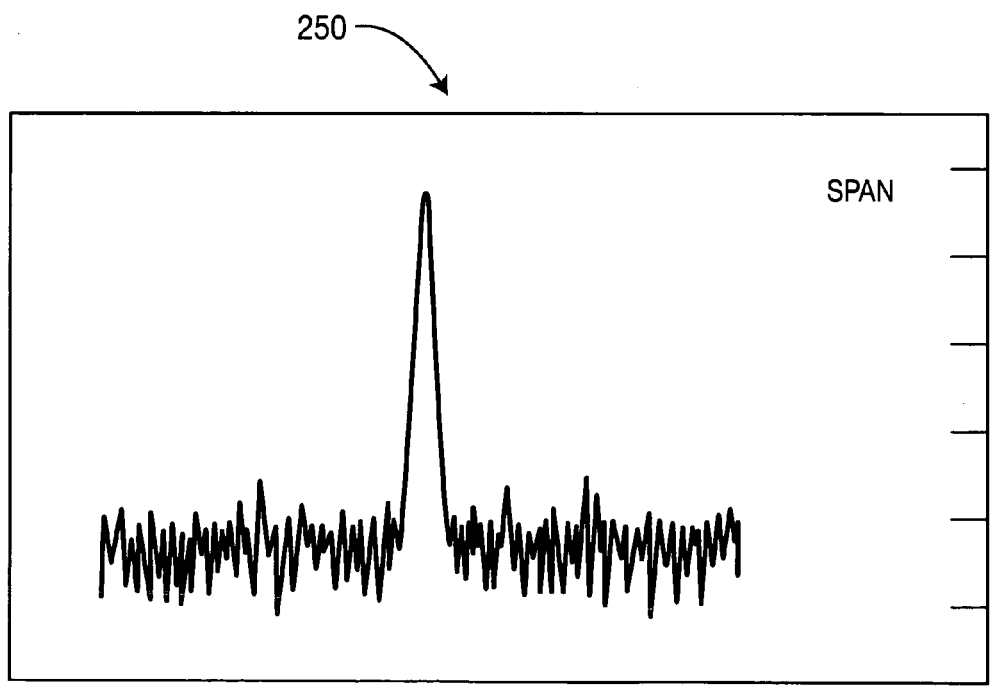
FIG. 13 shows a plot of oscillator output in accordance with the system of FIG. 1.

Turning out of sequence to FIG. 13, a plot 250 shows the output of an exemplary embodiment modulator comprising a wideband VCXO that enables a wide pulling range without sacrificing too much of the high tank circuit quality "Q". The plot 250 shows that this results in a clean modulation process with sidebands well below 50 dBc with respect to the carrier. Since the modulating signal is based on a level-to-time conversion process, the width of the signal changes with respect to the incoming data stream in a predetermined manner. When this signal is fed into a varactor diode connected to the VCXO tank circuit, the stationary chaotic dynamics of the oscillator are changed due to the change in the effective inductance presented by the tank circuit. Thus, as can be seen in the plot 250, the output from the oscillator is clean with modulation components at least 50–60 dB down. The signal can be limited and detected with a phase-locked loop ("PLL") or a high-speed detector. Exemplary embodiments provides chaos generation using the exemplary non-linear operation of a Colpitts oscillator driven by a tent map to aid synchronization between a transmitter and a receiver.

Figure 3:
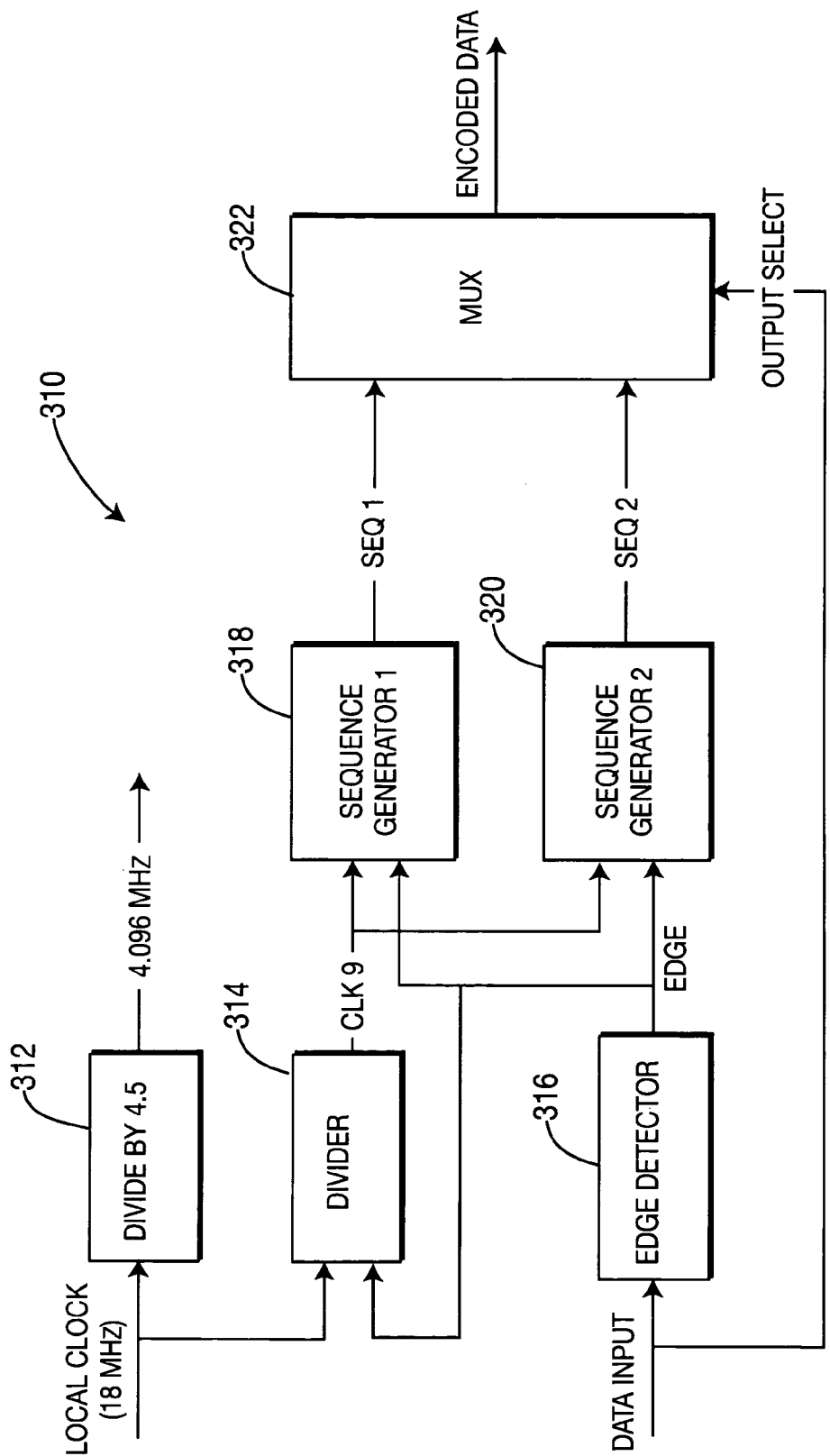
FIG. 3 shows a block diagram for an encoder in accordance with the system of FIGS. 1 and 2.

Turning now to FIG. 3, an encoder 310 represents an exemplary embodiment of the encoder 214 of FIG. 2. The encoder 310 includes a by 4.5 ("×4.5") divider 312 for receiving a local 18 MHz clock signal, and providing a 4.096 MHz signal. The local clock signal is also received by a divider 314. An edge detector 316 receives input data and provides an edge signal to the divider 314 as well as to a first sequence generator 318 and a second sequence generator 320. The divider 314 provides a CLK9 signal to the first and second sequence generators 318 and 320, respectively. A MUX 322 receives a SEQ1 and SEQ2 signals from the sequence generators 318 and 320, respectively, and further receives the input data signal at its output select terminal. The MUX 322 provides an encoded data signal output.

Figure 4:
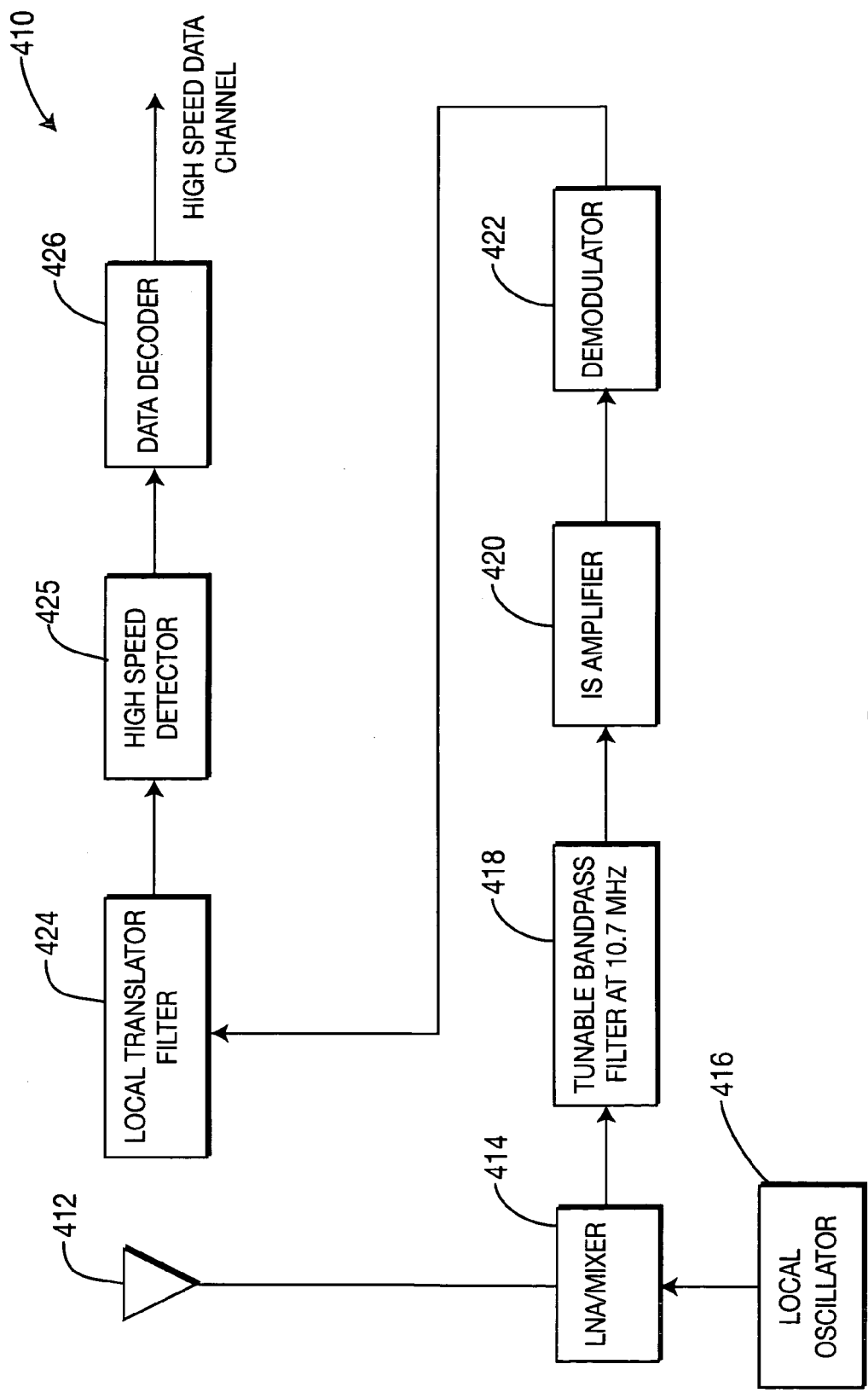
FIG. 4 shows a block diagram for a narrow band chaotic communication receiver in accordance with the system of FIG. 1.

As shown in FIG. 4, a narrow band chaotic communications receiver 410 represents an exemplary embodiment of the receiver 116 of FIG. 1. The receiver 410 includes an incoming communications buffer 412 in signal communication with a low-noise amplifier ("LNA") and/or mixer 414. A local oscillator 416 also feeds the LNA/Mixer 414. A tunable band-pass filter 418 passes the 10.7 MHz center frequency band with a bandwidth of 2 KHz to an IF amplifier 420, which feeds a demodulator 422. A level translator/filter section 424 is in signal communication with the demodulator 422, which comprises a PLL, discriminator and high-speed detector. The demodulator 422 feeds a high-speed detector 425, which, in turn, feeds a data decoder 426 that outputs to a high-speed data channel.

Figure 12:
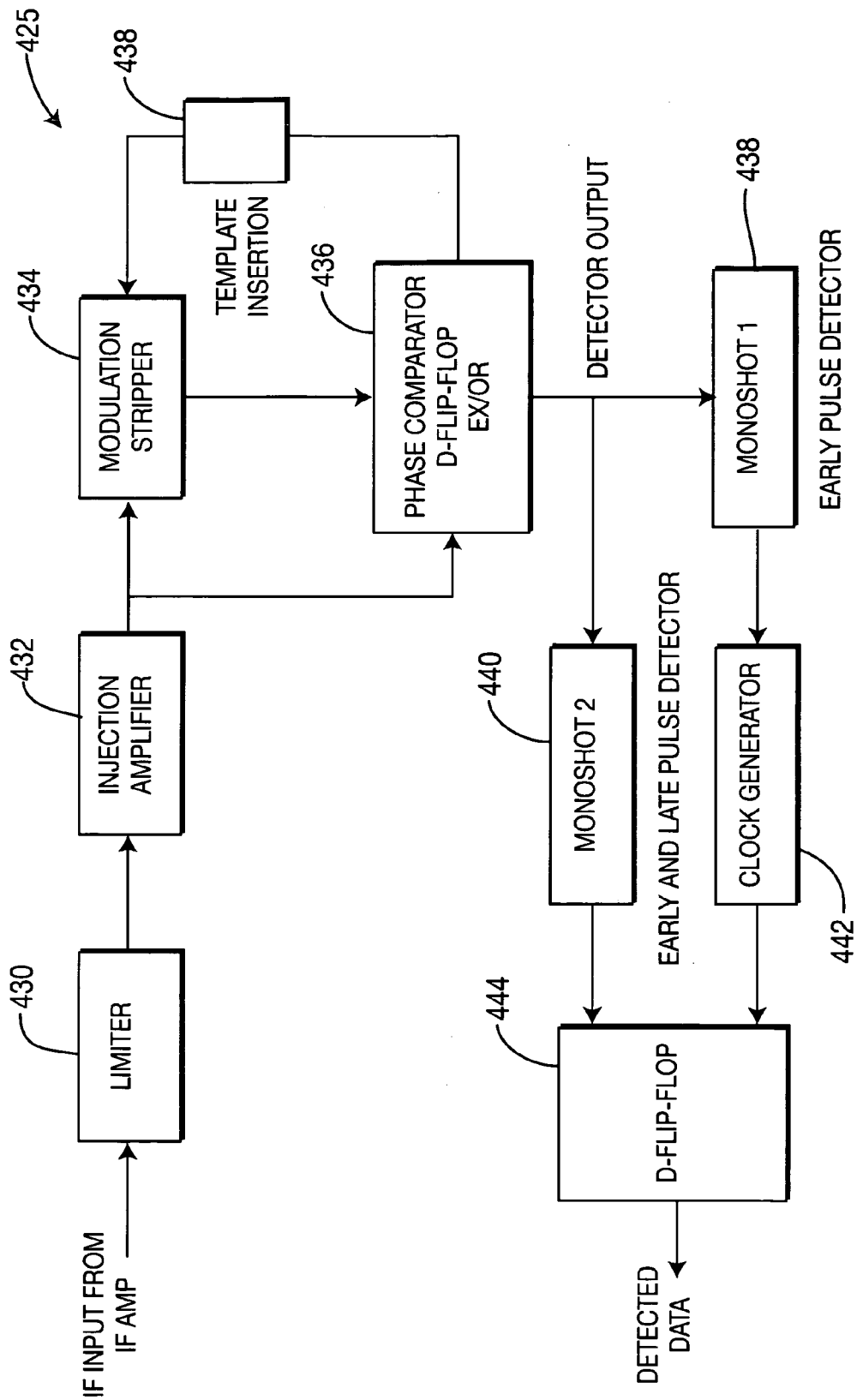
FIG. 12 shows a block diagram for a high-speed phase change detector in accordance with the system of FIG. 4.

Turning out of sequence to FIG. 12, an exemplary embodiment of the high-speed detector 425 of FIG. 4 is indicated generally by the reference numeral 425. The detector 425 includes a limiter 430 for receiving the output of filter 424 of FIG. 4, which indicates an IF input from the IF amplifier 420 of FIG. 4. The limiter 430 feeds an injection amplifier 432, which in turn, feeds a modulation stripper 434 and a phase comparator 436. The phase comparator 436 may be substituted with a D-type flip-flop or an EX-OR device in alternate embodiments. The phase comparator 436 feeds a template insertion block 438, which, in turn, feeds a second input to the modulation stripper 434. The output of the modulation stripper 434 feeds a second input to the phase comparator 436. The output of the phase comparator 436 feeds first and second monoshots 439 and 440, respectively.

The monoshot 439 feeds a clock generator 442, which, in turn, feeds a first input of a D-type flip-flop 444. The monoshot 440 feeds a second input of the D-type flip-flop 444. The D-type flip-flop 444 produces a data signal coupled to the data decoder 426 of FIG. 4.

Figure 5:
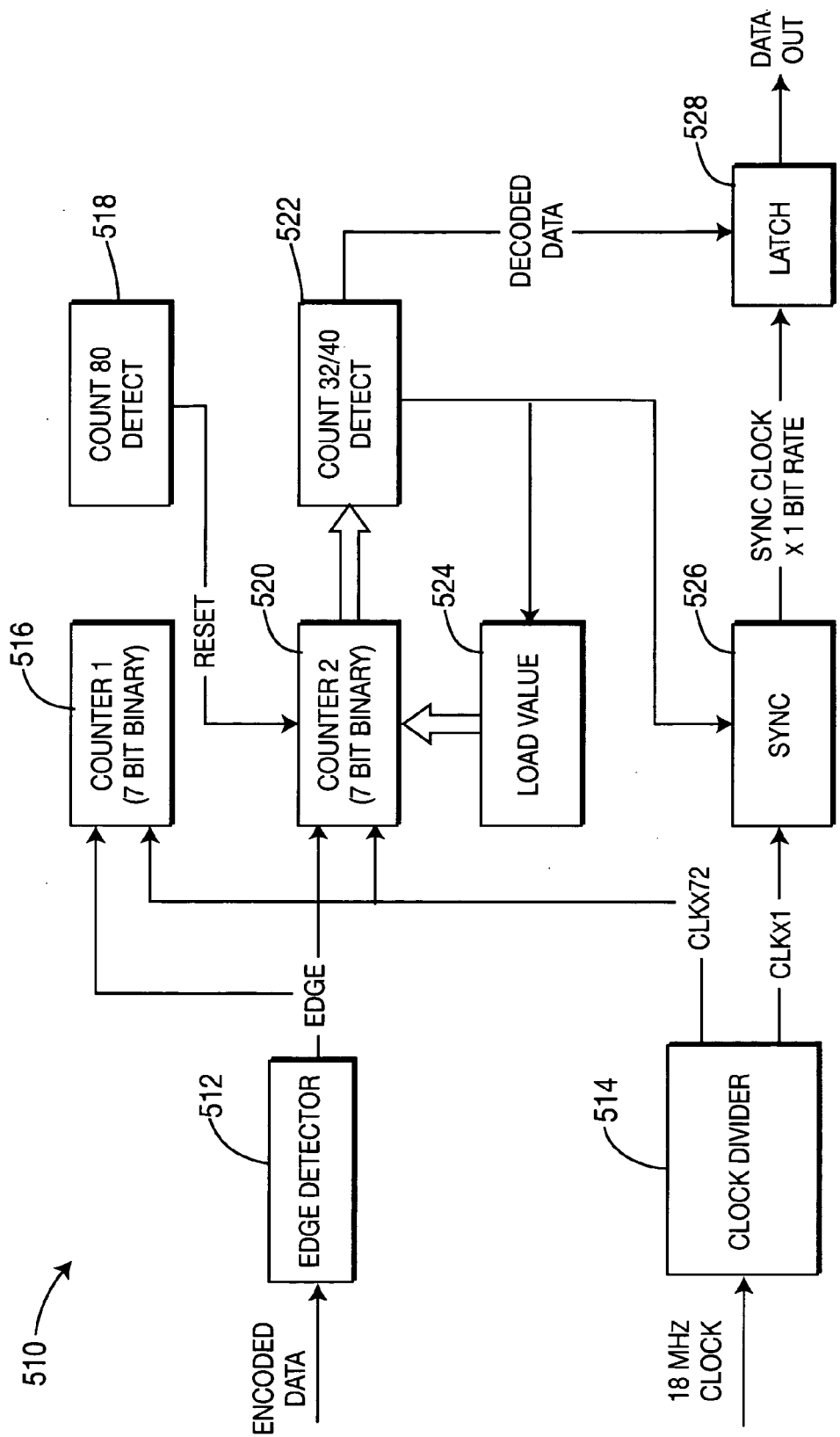
FIG. 5 shows a block diagram for a decoder in accordance with the system of FIGS. 1 and 4.

Turning now to FIG. 5, a decoder 510 represents an exemplary embodiment of the decoder 426 of FIG. 4. The decoder 510 includes an edge detector 512 for receiving encoded data and providing an EDGE signal to first and second 7-bit binary counters 516 and 520, respectively. A clock divider 514 receives the 18 MHz clock signal and provides a CLKx72 signal to the first and second counters 516 and 520. A count-64 detector 518 is in signal communication with the first counter 516, and feeds a reset signal to the second counter 520. A count-64/80 detector 522 is in signal communication with the second counter 520, feeds each of a load value function 524 and a synchronization function 526, and provides decoded data to a latch 528. The load value function 524 feeds the second counter 520. The synchronization function 526 receives a CLKx1 signal from the clock divider 514, and provides a SYNC clock to the latch 528 at a ×1 bit rate. The latch, in turn, provides output data.

Figure 6:
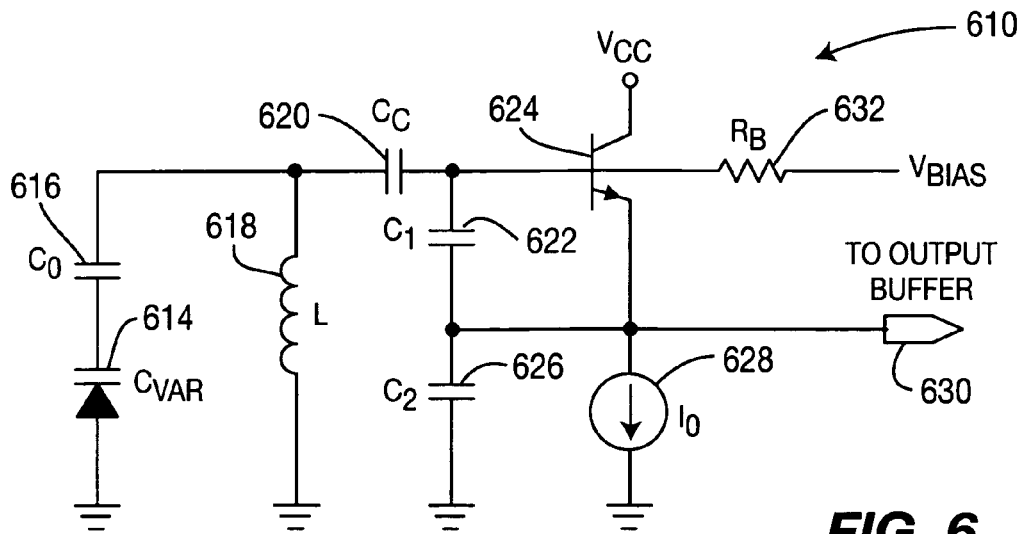
FIG. 6 shows a schematic diagram for an exemplary Colpitts oscillator for use in describing the operation of a system in accordance with FIG. 1.

As shown in FIG. 6, an exemplary Colpitts oscillator is indicated generally by the reference numeral 610. The oscillator 610 includes a diode 612 having its anode grounded and its cathode coupled to a Cvar capacitor 614, which is coupled, in turn, to a C0 capacitor 616. The capacitor 616, in turn, is coupled to an L inductor 618, which is then grounded. The capacitor 616 is also coupled to a Cc capacitor 620. The capacitor 620, in turn, is coupled to a C1 capacitor 622 as well as to the base of a transistor 624. The transistor 624 has its collector coupled to Vcc, and its emitter coupled to the output of capacitor 622, which output is then coupled to a grounded C2 capacitor 626, a grounded Iq current source 628, and an output buffer 630. The base of the transistor 624 is coupled to an Rb resistor 632 to provide a Vbias voltage bias output.

In operation, systems have different flows dictated by the architecture or the non-linear system. The RF transformations are essentially identical in all cases. The primary differences are found in the realization of the maps, flows and the synchronization circuitry. First, generation of maps and flows are considered.

Figure 7:
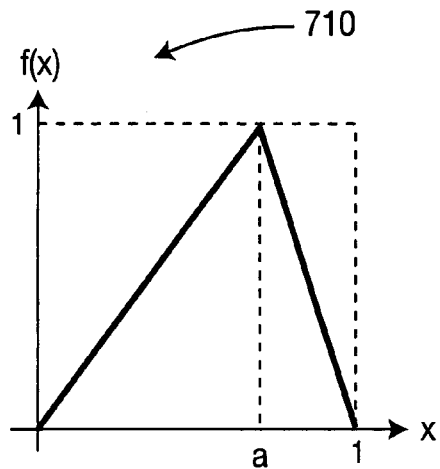
FIG. 7 shows a plot of a skewed tent map for use with the system of FIG. 1.
Figure 8:
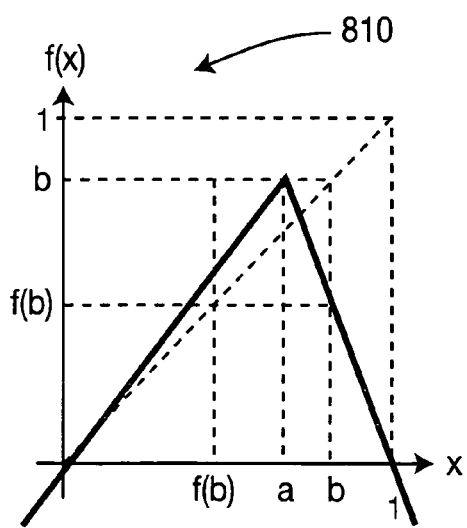
FIG. 8 shows a plot of another skewed tent map for use with the system of FIG. 1.

Referring to FIGS. 7 and 8, a first exemplary skewed tent map function f(x) is generally indicated by the reference numeral 710 of FIG. 7, and a second exemplary skewed tent map function 810 is generally indicated by the reference numeral 810 of FIG. 8. Transmission of information utilizing Skewed Tent Maps is considered with iteration of a skewed tent map 710 or 810 centered on 0. Since the only state variable of this dynamical system is directly transmitted, it is a very straightforward approach to a non-linear dynamical system. Since the partitioning of the period is asymmetric, the skewed tent map is always non-invertible. This means that if the time dimension is also factored into this system, a 1-D skewed tent map that exhibits flow is produced. The encoding algorithm is defined as follows:

The whole bit duration is partitioned into 9 equal subintervals by using a ×9 clock for the encoding process. If the incoming bit stream has a "0" to "1" transition, then the encoder outputs a width of 10 equal intervals of ×9 clock. When there is a "1" to "0" transition, a width corresponding to 8 cycles of ×9 is used for encoding. If there is no change for the data, a width corresponding to a width of "9" clock pulses is encoded. For a tent map to exhibit flow, there should be asymmetry in the partition. Hence, when a width of "9" is output, there will be no flow.

In the receiver, an exact replica of the transmitter map is generated for comparison, generating an error signal for correction. The decoding algorithm can be forced into synchronism by an initial pattern followed by periodic resetting of the master clock. This way the orbits of chaos are controlled. This method of synchronization is based on recovered trajectories.

The skew-tent map $f:[0,1]\to[0,1]$ is given by:

$$f(x) = x/a \text{ if } 0 \leq x \leq a;$$

$$f(x) = (1-x)/(1-a) \text{ if } a < x \leq 1$$

as represented by the function 710 of FIG. 7. It is a non-invertible transformation of the unit interval into itself. It depends on the parameter "a", which may be satisfied by the limit $0.5 < a < 1$. The transformation is continuous and piecewise linear, with linear regions $[0,a]$ and $[a,1]$.

Figure 10:
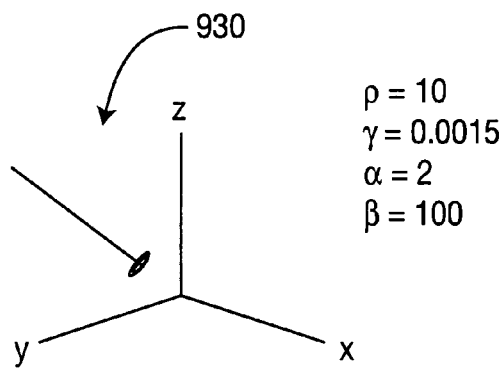
FIG. 10 shows a plot for a chaotic limit cycle for use with the system of FIG. 1.

The typical trajectory x(k) of the dynamical system obtained by iterating the map $x(k)=f(x(0))=f(f(\ldots f(x(0))\ldots))$ for $k=0,1,2,\ldots$, is shown in FIG. 10 for 300 points of a typical trajectory. A unique feature of the presently disclosed approach is to manipulate the encoding process to generate the skewed tent map such that the map will aid in both synchronization as well as data transmission. For this to happen, we need to iterate the map through many cycles before synchronism can be achieved. To aid the iteration process, the skewed tent map is first converted to a higher intermediate frequency, which is then used for iterating the lower frequency signals out of the map since this concept does not work directly at the lower base-band map frequencies.

Next, we let x(k) for $k=1,2\ldots N$ be the transmitted signal, and y(k) for $k=1,2\ldots N$ be the received signal, and consider both the functions to start from x(0) and y(0). If both trajectories are in the same region until time k, we can write:

$$|[x(j+1)-y(j+1)]|=|f'(x(j))||[x(j)-y(j)]| \text{ for } j=0,1,2,\ldots,k-1$$

where f'(x) denotes the derivative of f at a point x. Thus, we can write:

$$|[x(k)-y(k)]|=|f'(x(k-1))||f'(x(k-2))|\ldots|f'(x(0))||[x(0)-y(0)]|$$

The above equation can be equivalently stated as:

$$|[x(k)-y(k)]|=e^{\lambda k}|[x(0)-y(0)]|, \text{ where } \lambda=1/k\Sigma\ln|f'(x(j))|$$

with limits for j going from 0 to k−1. The interpretation is that λ gives the average rate of divergence, if λ>0, or convergence, if λ<0, of the two trajectories from each other. Simulations show that about 10 to 15 cycles are typically needed for the convergence of the trajectories. This implies that the Intermediate frequency on which the Skewed tent map is being transferred is preferably between 50 and 100 times the map frequency to obtain clean, burst free synchronism. The number of limit cycles needed for stabilization by the synchronizing loop influences the choice for the intermediate frequency.

An upper and lower bound for λ are deduced by taking the derivative of f(x) as f'(x). Observing the skewed tent map, the left branch has a slope $1/a > 1$ and the slope for the right branch is $-1/(1-a) < -1$. Now we can define the limits of the derivative for f(x) as $1 < 1/a \leq 1/(1-a)$.

We can deduce a lower and upper bound for λ as $0 < -\ln(a) \leq \lambda \leq -\ln(1-a)$. In our case, a=0.55, we have the bounds for $\lambda$ as $0<0.597<=\lambda<=0.798$. Since the value of $\lambda$ is >0, this indicates a divergent system. If we follow the trajectories of both x(k) and y(k) beyond k, eventually they will fall into different linear regions. The existence of the limit (bounds) for $\lambda$ and its independence to a certain degree, of the particular trajectory, is linked to the presence of a unique probability density that is invariant under the action of the map f. For the skewed tent map, we can write an equation for the probability density on [0,1] as:

$$\rho(x)=a\rho(ax)+(1-a)\rho(1-(1-a)x)$$

It follows from Hasler and Maistrenko that a skewed tent map has a constant probability density and the Lyapunov exponent $\lambda$ can be defined as:

$$\lambda = \int ln|f'(x)| \rho(x) dx, \text{ with limits of integration between 0 and 1}$$

For the skewed tent map and constant probability density, the above formula becomes:

$$\lambda = -a\, In(a) - (1-a) In(1-a)$$

Thus, a=0.55 yields 8=0.688. In order to have robust synchronization, we choose a coupling with coupling parameters * and γ. When the transmitter map is coupled to the receiver map, we get a two dimensional map defined by:

$$\begin{Bmatrix} x(k+1) \\ y(k+1) \end{Bmatrix} = G \begin{Bmatrix} x(k) \\ y(k) \end{Bmatrix} = \begin{Bmatrix} f[x(k)+\delta\{y(k)-x(k)\}] \\ f[y(k)+\varepsilon\{x(k)-y(k)\}] \end{Bmatrix}$$

The coupling parameters * and $\epsilon$ can take any values. As it turns out, the qualitative behavior of the system depends essentially on *+$\epsilon$. Since x(k) influences y(k), we call this the master-slave relationship. We define that the system is synchronized if:

$$|[x(k)-y(k)]| \to 0 \text{ as } k \to \infty.$$

The Jacobian matrix for this condition for x=y can be written as:

$$D\begin{Bmatrix} x \\ x \end{Bmatrix} = C \begin{Bmatrix} (1-\delta) & \delta \\ \varepsilon & (1-\varepsilon) \end{Bmatrix}$$

where c=-1/(1-a) if $a \leq x \leq 1$, or 1/a if $023 \, x \leq a$. The eigenvectors are:

$$\xi_1 = [1,1]^T \, \xi_2 = [\delta, -\epsilon]^T$$

$$\mu_1(x) = \begin{cases} 1/a & \text{if } x \leq a \\ -1/(1-a) & \text{if } a < x \end{cases}$$

$$\mu_2(x) = \begin{cases} 1/a\,(1-\delta-\varepsilon) & \text{if } 0 \leq x \leq a \\ -1/(1-a)\,(1-\delta-\varepsilon) & \text{if } a \leq x \leq 1 \end{cases}$$

The transverse Lyapunov exponent is $\lambda_x = -a\, In(a)-(1-a) In (1-a)+In(1-d)$, where d=δ+ε. It is a property of identical Skewed Tent maps (e.g., Transmitter and Receiver) coupled in the above manner that they will always have a transverse Lyapunov exponent whenever the coupling parameter d=δ+ε belongs to the interval [1−Δ], [1+Δ] where Δ is given by:

$$In(\Delta) = a\, In(a)+(1-a) In(1-a)$$

In the exemplary system, a=0.55. Therefore, Δ has a value 0.5025, and with δ=0, synchronization occurs only when In (1−d)=0.4974.

The information carrying capability of chaotic signals is now considered. Production and disappearance of information in a Drive-Response system can be represented by either a Bernoulli map or a skewed tent map, where we observe the dynamic mapping of a unit interval into itself. We have seen that the synchronizing boundary is where $-8_t$ is less than zero. For a noiseless channel with disconnected feedback loop, d=1 and $-8_t=0$ determine the boundary of synchronization stability.

$$-8 = -In\xi |1-d\xi|$$

If there is no feedback and no external noise in the receiver, this corresponds to a communication channel with capacity C=infinity. Synchronization is possible at any high rate of information production by the chaotic system. This shows that for synchronizing the drive and response system in the absence of noise, it is sufficient to have a channel with information carrying capacity $C > -8_t$ where $-8_t \, log_2(e)$. Here, we express a Lyapunov exponent as the information-producing rate expressed in base (e) units and −8 as the bits per iterate. In our case, we have 10.7 MHz/128 KHz iterations =84 and the bits per iterate is:

$$0.688 \, log_2(2.71828)=0.9926 \text{ bits per iteration.}$$

Hence, the average value of information produced can be stated as 84×0.9926=83.3784 bits per second. Applying this result to Shannon-Hartley Channel Capacity theorem, we have $C=W\, log_2(P+N)/N$, where C is the channel capacity, W is the channel bandwidth and (P+N)/N is the signal-to-noise ratio. When compared with a standard linear communication system, the presently disclosed method allows the average information processing capability to go up by 83 times, assuming no change in channel bandwidth. If, however, the channel bandwidth is reduced by 83 times, our signal-to-noise ratio essentially remains the same as that of a linear communication system. It is a significant advantage of the Narrow band Chaotic modulation system that we do not pay a penalty in signal-to-noise ratio in order to narrow the bandwidth.

In contrast, with a traditional communication system having a fixed channel capacity C, if the bandwidth occupied by the signal is reduced, we must have a higher P+N/N to balance the equation. For example, if we need to send 830 Kbps of data using a modulation scheme that has a 1 bit/sec/hertz bandwidth efficiency, we must at least have 830 Khz of bandwidth. Thus, embodiments of the present disclosure enable 830 Kbps to be sent in a 10 Khz bandwidth due to the increased bandwidth efficiency. A traditional linear system will not be able to send 830 kbps in a 10 Khz bandwidth since the required P+N/N is not physically realizable.

Stationary chaotic signal generation in a Colpitts oscillator is now considered. Stable, periodic, self-sustained oscillation for a dissipative dynamical system is represented by a stable limit cycle in phase space. If the oscillator is forced externally, this simple dynamic is generally destroyed. In order to quantify the effects of the forcing function, we need to introduce the new variables of the unforced system, namely the phase and amplitude. The phase is a variable that corresponds to the motion along the limit cycle that is along a direction where neither expansion nor contraction of the phase volume is happening. This corresponds to a "zero Lyapunov exponent" condition. Thus, the dynamics of the phase of the oscillator can be written as:

$$dM/dt = To \text{ where } To = 2B/T_0$$

Amplitudes and all other variables of the dynamical system are locally transversal to the cycle corresponding to the negative Lyapunov exponents. The description in terms of the Lyapunov exponent demonstrates why the phase is an exceptional variable of the dynamical system. Since it corresponds to the sole neutrally stable direction, the phase, in contrast to amplitudes, can be controlled by a very weak external action. A weak perturbation to the amplitude will relax to its stable value. However, a small perturbation to phase will neither grow nor decay. Thus, even small perturbations on phase can be accumulated.

Returning to FIG. 6, the circuit for a Colpitts oscillator can be used for analysis. This model contains three dynamical elements: $C_1$, $C_2$ and L. Since the statistical transistor model contains only 3 elements, the dynamical system is of third order. The non-linearity in the system is due to the non-linear $V_{BE}$–$I_b$ relationship for the transistor 624, where $I_b = f(V_{BE}) = \text{Is} \exp\{V_{BE}/mV_t\}$.

The current in the base-emitter branch $I_b$ is a non-linear function of voltage $V_{BE}$ along this branch. Since the current in the collector-emitter branch $I_c$ is linearly current controlled by $I_b$ according to the relation $I_c = -\exists I_b$, $I_c$ also depends on $V_{BE}$ in a non-linear manner. The constants $I_b$, $mV_t$ and $-\exists$ are constants of the transistor. From the network analysis of the Colpitts oscillator, two independent node equations and a mesh equation are obtained. Together with the voltage-current relationship of the network devices, the following set of equations can be derived.

$$0 = I_L + I_b + I_{C1} = I_L + f(v_{C1}) + C_1 dv_{C1}/dt \quad (1)$$

$$0 = I_L + I_C - I_{C2} - I_0 = -I_L + \exists f(V_{C1}) - C_2 dv_{C2}/dt - I_0 \quad (2)$$

$$0 = v_{C1} + v_{C2} - v_L - v_r = v_{C1} + v_{C2} + LdI_L/dt - v_r \quad (3)$$

where $V_{BE} = V_{C1}$. We normalize the above equations with the following substitutions:

$t_n = t/RLC_1$, $x = I_L/1A$, $y = V_{C1}/1v$, $z = V_{C2}/1A$, $\forall = C_1/C_2$,
$(= C_1/L$ and $f_N(y) = f(y1v)/1A$, $\Delta = R_L/1\Sigma$ and
$\Pi_0 = I_0/1A$.

Equations 1, 2 and 3 can be rewritten for the transmitter as:

$$x' = (\Delta(-\Delta x + y + z)$$

$$y' = -\Delta(x + f(y)) + \gamma_{12}(x - x_1)$$

$$z' = \forall \Delta(-x + \exists f(y) - \Pi_0)$$

For the receiver, the equations can be written as:

$$x_1' = (\Delta(-\Delta x_1 + y_1 + z_1)$$

$$y_1' = -\Delta(x_1 + f(y)) + \gamma_{21}(x - x_1)$$

$$z_1' = \forall \Delta(-x_1 + \exists f(y) - \Pi_1 0)$$

where $-\gamma_{21} = 0$ as the coupling is directional and is equal to $1/R_L$.

Figure 9:
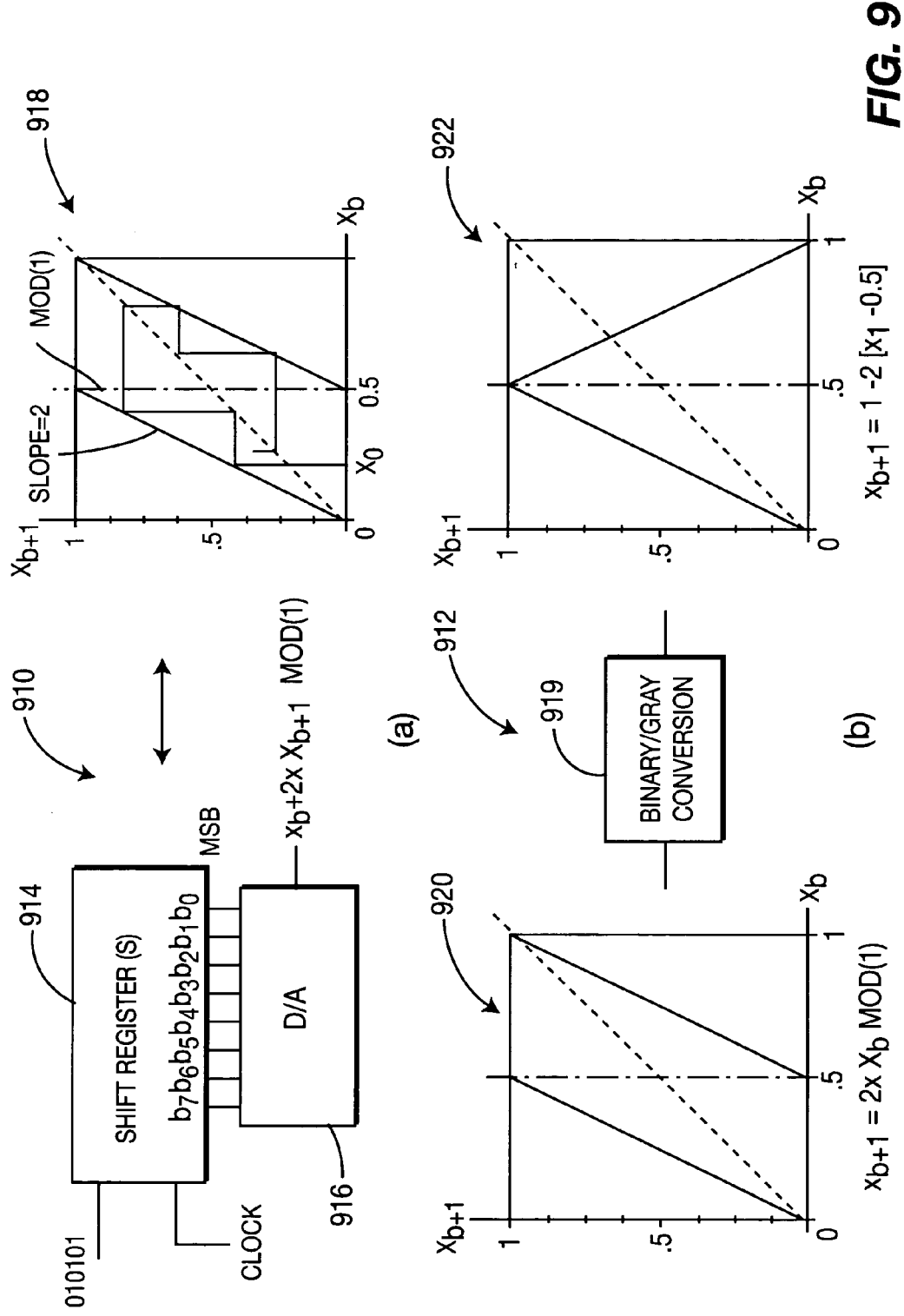
FIG. 9A shows a schematic diagram for a shift register as a Bernoulli shift process for use with the system of FIG. 1.
FIG. 9B shows a function diagram for a shift map to tent map conversion in accordance with the shift register of FIG. 9A for use with the system of FIG. 1.

As shown in FIGS. 9A and 9B, first and second portions 910 and 912, respectively, of an encoding algorithm are indicated. In the first portion 910, a Bernoulli shift process is implemented with a standard shift register 914 in communication with a D/A converter 916 to provide a signal 918 corresponding to $x_{k+1} = 2X_k \bmod[1]$. In the second portion 912, the effect of a binary to gray conversion 919 is illustrated as the conversion from the defining equation $x_{k+1} = 2X_k \bmod[1]$, provided by the Bernoulli shift process and indicated by the reference numeral 920, to the gray-level equation $x_{k+1} = 1 - 2|X_k - 0.51|$ as indicated by the reference numeral 922.

Figure 11:
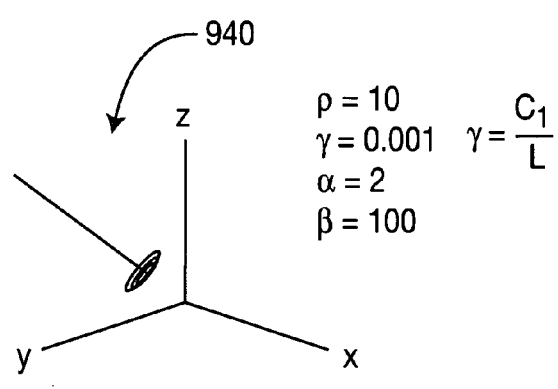
FIG. 11 shows an alternate plot for a chaotic limit cycle for use with the system of FIG. 1.

Turning to FIGS. 10 and 11, the above non-linear equations were analyzed using dynamics solver software. In the case of FIG. 10, $\forall = 2$, $( = 0.0015, \Delta = 10, \Pi = 3 \times 10^{-2}, \exists = 100$ yielded the response 930. In the case of FIG. 11, $\forall = 2$, $( = 0.001, \Delta = 10, \Pi = 3 \times 10^{-2}, \exists = 100$ yielded the response 940. The response 940 suggests the presence of a stable periodic orbit after 10 cycles. The system is stable and approaches a stable fixed point in the y–z plane after about 10 cycles. At synchronization, $x = x_1$, $y = y_1$, and $z = z_1$.

For modulation transfer, modulation is impressed on the tank circuit by connecting a varactor diode across the tank circuit. When an encoded signal having either a tent Map, Bernoulli map, Henon map or a Baker's map is impressed upon the varactor, the resonant frequency changes, resulting in a change to the effective value of the inductance. The will alter the value of–(slightly, giving rise to different limit cycle patterns. Since $-\forall$ is always less than 1, the system is stable and will have limit cycles.

The simulation results of FIGS. 10 and 11 indicate that the limit cycle patterns are different for the different stimuli, and this variational feature is exploited in the detection of the signal in the receiver using an injection locked phase detector. Another feature of the present disclosure is that, by impressing the encoded tent map on to the High frequency oscillator, the limit cycles happen at the RF rather than at base band. The constraint imposed on the encoded waveform makes sure that the bandwidth needed to send the information is very narrow. The transmitter and receiver are in accordance with the block diagrams shown in FIG. 2 and FIG. 4, respectively.

With this system architecture, embodiments of the present disclosure include the ability of the encoding scheme, signal conditioning and modulating elements of the transmitter to restrict the bandwidth required to send information over a channel. Demodulation is accomplished by various methods such as PLL, FM Discriminator or a higher gain phase detector. Most of the popular modulation schemes employing M-ary techniques keep the modulator "on" or "off" over the whole duration of the symbol times. Certain bandwidth efficient schemes such as, for example, Feher's modulation scheme, Minimum Shift Keying ("MSK"), and raised cosine shaped Offset Quadrature Phase Shift Keying ("OQPSK") attempt to restrict the bandwidth of the modulation components. The waveforms used are periodic, with well-defined boundaries and, hence, interpolation techniques can be applied to reconstruct the signal back in the receiver. Minimum bandwidth required to send information across a channel is a strong function of the energy/bit and the noise bandwidth. The exemplary system that is disclosed here integrates the limiting conditions for maximizing the channel capacity by reducing the noise bandwidth, employing a VCXO that is forced by a map, and is able to transfer the modulation onto the operating frequency of the crystal by mode locking the oscillator frequency with the frequency of the forcing frequency at a particular amplitude of the forcing frequency.

When the forcing frequency with varying bit widths is impressed on a varactor, corresponding to the transition points, a step response is generated. Due to the linear frequency versus voltage characteristics of the Hyper-abrupt varactor diode, a ramp corresponding to a Bernoulli map in the frequency domain is created. The negative going pulse will result in an A Cos ($\omega t-\phi_1$) or A Cos($\omega t-\phi_2$) phase shift for the local oscillator ("LO"). $\phi$ is calculated as $\pi/m$ where m=9 in this particular case. Typically, the perturbation at the phase change point on the modulated signal reaches a steady-state condition within 2–3 carrier cycles. The encoding process ensures that the periodicity of the phase changes happen within a window of 0.44 to 0.55 of the bit rate. The local oscillator is chosen to be at 10.7 MHz in this exemplary embodiment. Sidebands are at least 55–60 db down. The output of the oscillator is taken from the modulating point on the varactor, buffered and passed through a semi-lattice filter for further improvement in carrier-to-noise ratio at the transmitter. This signal is further up-converted to an appropriate band for transmission using Image reject mixing. The above method can be used at various frequencies. Choice of the $1^{st}$ local oscillator ("LO") is based on the criteria that the $1^{st}$ LO should have at least 10–20 carrier cycles between modulation signal bit boundaries.

Another element of this system is an encoding and decoding system that converts the incoming Non-Return-To-Zero ("NRZ") bit stream into a variable bit width stream, thereby altering the spectral characteristics of the original NRZ signal. The rules for this encoding are as follows:

1) If there is a change from 0 to 1, encode a width of the bit to include 8 cycles of ×9 clock.

2) If there is no change, encode with a 9 cycles of ×9 clock

3) If there is a 1 to 0 transition, encode a width of the bit to include 10 cycles of ×9 clock.

This type of mapping maps a unit period into itself, and is a non-invertible map that has a flow. Increasing and decreasing the pulse width to accommodate 8 clock cycles, 9 clock cycles or 10 clock cycles are exemplary embodiments. Higher numbers of encoded clock cycles are possible, but system performance in view of multi-path effects coupled with zero-crossing detection accuracy will be elements that may influence the maximum frequency that an encoding and/or decoding clock should have in a given system.

The coding technique is unique in that, if the encoded waveform is observed closely, depending on whether there was a 1 to 0 transition or a 0 to 1 transition on the original NRZ waveform, the encoded waveform would have the phase change points later or earlier than the phase change points associated with the bit boundaries. When there are no changes to the levels in the original NRZ waveform, as is the case with repeated bits, a width corresponding to 9 clock cycles of ×9 clock is embedded. Since a=0.5 in this case, there will be no flow. There is only one transition per bit and on the receiver side, and the signal reconstruction in the receiver utilizes the periods between adjacent pulses to process back the NRZ information. The output of the encoder is fed into the varactor on the VCXO.

At the receiver, the received signal is converted into the intermediate frequency ("IF") and given a 90-degree phase shift so as to align phase transition boundaries (e.g., the phase of the transmitted signal had a phase shift of 90 degrees due to the integration process during the frequency domain mapping at the varactor). The IF is chosen in such a manner as to facilitate low cost design for the system. Other embodiments may use filters at 6 MHz, 10.7 MHz, 21.4 MHz, 70 MHz, 140 MHz, etc., due to their ready availability. A linear phase, band pass filter is required to filter out all "out of band" Fourier components. The output of the filter has information embedded in it in the form of phase or frequency modulation. This signal is frequency translated to the 900 MHz frequency band. In a preferred embodiment, the transmitter frequency is chosen to be at 902.77 MHz. The digital sub carrier is at 10.7 MHz. The $2^{nd}$ LO is chosen to be 892.07 MHz. Therefore, the entire digital signal transmission spectrum is within a bandwidth of about 10 kHz.

The receiver includes a down converter at 892.07 MHz. The output from the down converter is at 10.7 MHz. This signal is processed after sufficient band-pass filtering and amplification by a limiter. The 10.7 MHz filter should possess minimal group delay characteristics. The narrow-band filter used is very similar to the semi-lattice filters used in amateur radios as well as reported in Filter Design Handbook by Zverev. An FM discriminator or a PLL is included that, as a phase change detector, can be used detect and regenerate the variable bit-width signal similar to the one in the transmitter. Since we are employing the spatio-temporal characteristics of the signal to make an unambiguous detection, a higher gain in the detector will enhance the minimum signal detection capability of the system. PLLs need adequate signal-to-noise ratios for proper detection. Moreover, it is very difficult to have fast tracking capability with narrow tracking range. FM discriminators suffer from very low detector gains. Since a self similar replica of the original signal of proper amplitude and phase is needed at the receiver for detection, both the above systems work with poor efficiencies at low signal to noise ratios.

To address these deficiencies, the new high-speed detector 425 of FIGS. 4 and 12 is provided. A signal from a limiting section is fed into an injection amplifier that helps to maintain a steady output level for varying input levels. The injection amplifier acts as a fast tracking filter with minimal group delay in its tracking range. Further to this, the output from the injection amplifier is split into two branches. One branch is passed through an oscillator at 10.7 MHz with a high Q tank circuit. This operation virtually strips all modulation from the signal out of the limiter and serves as a reference signal. We call this branch the modulation stripper branch. The other branch is fed into either a type D flip-flop or an EX-OR gate. The output of the EX-OR gate or the D flip-flop will indicate phase change points. Since the zero crossing points on an FM discriminator, PLL or the new phase change detector are a series of pulses occurring at different instants of time, the output of the detector will vary in periodicity like the transmitted encoded wave form. Since most of the signal has been filtered off, both at the transmitter as well as the receiver, the energy of the spikes out of the detector is very low and there will be other spikes between the responses. To mitigate this problem, a one shot is used. The output from the detector will have only two pulse widths instead of the three widths that were originally used to modulate the transmitter. This is because the phase detectors are basically having a range of 0 to $\pi$. If the modulated bit width is "5", signal phase can exceed $\pi$. When this happens, the response folds back to the position that a "4" would occur. However, since both widths do not happen simultaneously, there are no, Inter-Symbol Interference ("ISI") problems. Instead of the EX-OR or D-flip flop for phase detection, a balanced modulator can be employed with the reference signal fed out of the modulation stripper branch and the signal out of the injection amplifier to the comparison branch. The IF output port will clearly show the phase change points. In order to enhance performance, noise must be kept to a minimum in the detection branch. This signal is this bit stream to re-construct back the original NRZ signal. The phase change output from the mono-shot will capture only one pulse. This will correspond to the bit width "4". A clock signal is generated out of this signal so that the decoder can be clocked. Another output from the phase change detector is processed through a mono-shot that will capture both of the pulses, but will filter out all the spikes in between. The chosen signal is fed into a D flip-flop and clocked by the clock signal. The output of this flip-flop will be the reproduced original data stream.

Referring back to FIG. 1 for a base-band data processing method, plain data from an external source is first block encoded for Forward Error Correction ("FEC") using a Reed-Solomon ("RS") error-correction code. A packetizer adds header and other redundant bits to FEC blocks and forms data packets. Packetized data is subjected to compression channel encoding. The encoded data is then modulated by a radio frequency ("RF") circuit to be transmitted over an RF link.

In the receiver, encoded data received over the RF link is demodulated to a base band signal and passed to decoder. The decoded data is de-packetized and FEC data blocks are fed to an RS decoder circuit. The RS decoder circuit validates and corrects errors. The error free original plain data stream is delivered to a destination. The steps involved in the encoding and decoding processes are further described below.

A transmitter 112 includes an FEC Encoder 118 wherein the raw user data is grouped into blocks of 235 bytes each. RS coding (255, 235) is applied to each block. For a block of 235 bytes, 20 bytes of error check bytes are added. A packetizer 120 adds header and trailer bits to the FEC encoded data blocks to send as packets. A compression encoder 122 encodes data packets for compression using a unique encoding scheme.

A receiver 116 includes a compression decoder 124 where a received data stream from an RF stage is decoded to retrieve original data packets. A de-packetizer 126 removes header and other pre-ambles from received data packets. Moreover, an FEC decoder 128 processes FEC coded received data blocks for error correction.

The encoding scheme is based on input data edge transitions. The encoded data width varies depending upon the input data transition. A higher clock is used at nine times the data bit rate. This clock is referred to as CLK_9 or CLK×9. The resulting code has three phase positions: 8, 9 or 10 times width of CLK_9 depending upon the input data transitions. A low to high transition is represented by 8 clock periods, a high to low transition is represented by 10 clock periods, and no transition is represented by 9 clock periods.

Encoded data has a transition for each input data bit. This allows the code to achieve the advantages of bi-phase coding where a base-band spectrum is clustered about two bands. Using further carrier suppression, high bandwidth efficiency is achieved. In addition, the output code transition is at the center of each bit. This improves bandwidth efficiency.

An exemplary implementation for the encoder is now described with respect to FIGS. 2 and 3. For an odd division ratio, an MP3 audio source needs a clock of 4.096 MHz for its operation. In the present system, an 18.432 MHz crystal is used as frequency source. This requires an odd division ratio of 4.5. The division is implemented using finite state machine design. A basic counter counts 000 to 111. The most significant bit is XOR'ed with the clock to give an additional edge at the transition from count 011 to 100. In addition, the counting sequence is controlled using a state machine. Effectively, count 4 is extended to count 4.5.

An input data edge is detected using a digital technique. There are two edge-triggered latches used to capture positive and negative edges of input data respectively. These latches are cleared with a 'clear latch' signal that is generated at a rising edge of the clock in a synchronous fashion. There are two advantages of this type of edge detection. First, unlike conventional edge detection, external resistor and capacitor use is avoided. A second and more important advantage is that the edge remains visible until the rising edge of the local clock, which is used as reference for all phase transitions. This avoids the problem of missing an edge due to a race condition, and also allows straightforward synchronous digital design implementations.

The local clock is divided to generate the CLK_9 clock, which is used for encoding. This clock generation is synchronized with the input data edges, and is used as an input to sequence generators. Two sequence generators are used to generate the encoded output. One generates 5 1's and 4 0's, the other generates 4 1's and 5 0's. The choice of 5 and 4 allows a change of encoded waveform at the center of each data bit.

A multiplexer selects an output of the sequence generators depending on the input data state. The output of the multiplexer is compression-encoded data. The output from the encoder is low-pass filtered. This renders the varying-width pulses to tent and inverted tent maps, which are then used to modulate the 10.7 MHz sub-carrier.

Decoding is accomplished as shown in FIGS. 4 and 5. The decoding scheme works based on the encoded data input edge and width. Two 7 bit binary counters are used to measure incoming data width, and a decision for the output data is based on these counters. The input edge detection circuit synchronizes the counter values. A soft decision technique is applied with a variable threshold to decide the state of the output data. A clock at the data bit rate is generated locally and synchronized with the input data stream. Output data is then latched with the synchronized clock.

An input data edge is detected using a digital technique. This is the same as done in the encoder. There are two edge-triggered latches used to capture positive and negative edges of the input data, respectively. These latches are cleared with a 'clear_latch' signal that is generated at the rising edge of the clock in a synchronous fashion.

A local crystal clock generator at 18 MHz is divided to generate two clock signals. CLK_144 is 144 times the data rate. This is used for data sampling and input data width counting. The other clock is same as the data rate and is used for latching the final data output.

The first counter ("counter1") is used to track an input data width of 4 from the encoder CLK_9 clock. Since, in the decoder, CLK_144 is used for a counter, a count of 64 indicates the event of counting a width 4 pulse.

When the counter1 count reaches 64, the count64 detector circuit resets counter2. Counter2 is a 7-bit binary counter that counts 0 to 127 in free running mode. The count64 detector circuit controls the counting sequence of counter2.

A count 64/80 detector is implemented as follows: On every detected edge, a constant is loaded into the counter. The constant value is decided based upon the count at the edge and can be one of the following values: If the edge occurs 64 (i.e., 8×8) counts after reset, the constant value is 48 (i.e., 128−80). If the edge occurs 80 (i.e., 10×8) counts after reset, the constant value is 64 (i.e., 128−64). The constant values are chosen so that at the beginning of next incoming encoded data bit, the counter reaches a count of zero. This is used for output data transition generation. The constant as decided by the count64/80 detector circuit is stored in this circuit and loaded to counter2 at the rising edge of encoded data.

The event of counter2 reaching a count of zero is recorded in the synchronization circuit and used for synchronizing the locally generated clock. Decoded data is latched with the synchronized clock, and the output of the latch is the final decoded data.

Thus, the present disclosure provides a new type of secure, synchronized communication system using chaotic frequency modulation. A novel feature of this system is that the information bit stream is encoded in such a manner as to generate a coupled skewed tent map of the possible trajectories of the wave-form in order to stay within a bounded state-space region. An incidental advantage is that while transformation is to an Intermediate RF frequency, the whole chaotic perturbation can be contained in a very narrow bandwidth, thus reducing the noise in the system. The technique used here enables analog signals to be encoded into the digital realm and processed as digital signals within the same confinements of bandwidth. At the receiver side, a similar algorithmic generator is used to synchronize the receiver to the transmitter.

Realization of the symbol dynamics and encoding for maximum distance between the neighbors for adequate resolution, without impairing the non-linear chaotic process in the digital signal, allows flexibility in terms of adjustment of system parameters for synchronization. The systems disclosed herein have significant advantages over prior systems.

First, the system is totally digital. Second, chaotic sequences need to have a delay element (EX-OR) element in the symbolic encoder. Our encoding sequence automatically factors in the delay depending on the level transition of the input digital stream.

Third, chaotic synchronization happens due to the skewed tent maps arising out of the encoder modifying the stationary chaotic process of the Colpitts oscillator, which can be detected by a fast detector that looks for phase perturbations. The encoding algorithm automatically allows synchronization as well as information transmission. A combination of the symbolic algorithm and the non-linear chaos generation automatically generates an RF Tent map. This process is unique in that it allows for sharp noise reducing filters on both transmitter and receiver, resulting in superior noise performance.

Fourth, due to the choice of the encoding algorithm, the relative orbits of the spatial orbits can be controlled very precisely. This means that the look-up window is extremely constrained due to the symbolic selection. As long as the chaotic signal is passed faithfully through the band pass filter, decoding can be accomplished at the receiver by ensuring that the Lyapunov exponent is negative.

Fifth, prior disclosures of chaotic systems were essentially diverging or spread-spectrum in nature with relatively low amounts of data transfer. Our system is capable of transmitting 1–2 Mbps in a 60 KHz bandwidth. This defies Shannon's bound in the traditional sense. We apply Kolgomorov-Sinai bounds to the entropy function to explain the theory behind the operation. Intuitively, as this is a spatio-temporal modulation that has a tightly controlled constrain, the uncorrelated part of the signal does not carry any required information, and hence, can be filtered off.

Sixth, the choice of the encoding methodology allows seamless interface with various standards without having to develop complicated Media Access Control ("MAC") layers. Seventh, the presently disclosed constraint in the symbolic states substantially reduces the required bandwidth of the resultant modulation.

Therefore, architectures in accordance with the present disclosure address the limitations of the existing systems in terms of cost and complexity. Furthermore, system embodiments are capable of realizing multiple high-speed digital services over bandwidth constrained RF bands. Flexible architecture enables any radio, television or cellular station to be able to send separate digital information on separate sub-carriers on either side of the fundamental transmitting frequency, without violating FCC power spectral templates. Modulation and demodulation processes are very similar to conventional radio receivers, and hence, can be integrated with existing radio architectures.

In summary, embodiments of the present disclosure provide for low-complexity and high data-rate communication systems that are inherently secure, MAC free, and easily interfaced with existing systems. Multi-path effects are minimal because the embodiments use a timed modulation scheme wherein the energy occupancy for detection is a miniscule portion of the entire bit width.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and an output unit.

It is to be further understood that, because some of the constituent system components and method function blocks depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

As will be recognized by those of ordinary skill in the pertinent art based on the teachings herein, alternate embodiments are possible. Given the teachings of the disclosure provided herein, those of ordinary skill in the pertinent art will contemplate various alternate configurations and implementations of the transmitter 112 and the receiver 116, as well as the other elements of the system 110, while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for signal transmission comprising:

transmitting a signal indicative of chaotic frequency shift keyed data, said transmitting including providing input data; encoding the provided data for forward error correction, and for controlling orbits of chaos; packetizing the encoded data for modulation; and propagating the transmitted signal within a narrow frequency band so that the propagated signal is received substantially without degradation of the indicated data.

2. A method as defined in claim 1 wherein the narrow frequency band comprises a radio frequency band of less than about 10 kHz bandwidth.

3. A method as defined in claim 1 wherein the signal indicative of chaotic frequency shift keyed data is an intermediate frequency signal.

4. A method as defined in claim 1 wherein said encoding comprises modulating a composite information and chaos signal onto a carrier signal by frequency shift keying to form the chaotic frequency shift keyed data.

5. A method as defined in claim 1 wherein said encoding comprises deriving a chaos signal by frequency shift keying in accordance with a non-linear mapping function that exhibits flow.

6. A method comprising:

receiving a transmitted signal indicative of chaotic frequency shift keyed data substantially without degradation of the indicated data by controlling orbits of chaos, the transmitted signal being propagated within a narrow frequency band, and the receiving including:

decompressing the data indicated by the propagated signal;

de-packetizing the decompressed data; and decoding the de-packetized data to output data substantially without degradation from the transmitted data.

7. A method as defined in claim 6 wherein said decoding comprises demodulating a composite information and chaos signal from a carrier signal by high-speed detection to substantially recover the transmitted data.

8. A method as defined in claim 6 wherein the signal indicative of chaotic frequency shift keyed data is responsive to chaos generation using a non-linear operation of a Colpitts oscillator driven by a non-linear mapping function to aid synchronization between transmitting and receiving.

9. A method as defined in claim 6 wherein said decoding comprises deriving a chaos signal by at least one of a phase comparison and a frequency comparison in accordance with a non-linear mapping function that exhibits flow.

10. A method as defined in claim 9 wherein said decoding further comprises generating an exact replica of a transmitter map for comparison in accordance with said at least one of a phase comparison and a frequency comparison; and generating an error signal for correction.

11. A method for signal transmission comprising:

transmitting a signal indicative of chaotic frequency shift keyed data, said transmitting including providing input data; encoding the provided data to generate a tent map of possible orbits of chaos to stay within a bounded state-space region; packetizing the encoded data for modulation; and propagating the transmitted signal within a narrow frequency band so that the propagated signal is received substantially without degradation of the indicated data by controlling orbits of chaos.

* * * * *